United States Patent
Kosaras et al.

(10) Patent No.: US 10,703,337 B2
(45) Date of Patent: Jul. 7, 2020

(54) WIPER ARM AND WINDSCREEN WIPER SYSTEM FOR A MOTOR VEHICLE

(71) Applicant: Robert Bosch GmbH, Stuttgart (DE)

(72) Inventors: Peter Kosaras, Budapest (HU); Zsofia Horvath, Balatonfüzfo (HU); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 115 days.

(21) Appl. No.: 15/766,486

(22) PCT Filed: Sep. 13, 2016

(86) PCT No.: PCT/EP2016/071605
§ 371 (c)(1),
(2) Date: Apr. 6, 2018

(87) PCT Pub. No.: WO2017/060048
PCT Pub. Date: Apr. 13, 2017

(65) Prior Publication Data
US 2018/0297559 A1    Oct. 18, 2018

(30) Foreign Application Priority Data
Oct. 8, 2015   (DE) ................ 10 2015 219 529

(51) Int. Cl.
*B60S 1/34*     (2006.01)
(52) U.S. Cl.
CPC ............. *B60S 1/3465* (2013.01); *B60S 1/345* (2013.01); *B60S 1/3463* (2013.01); *B60S 1/3468* (2013.01)

(58) Field of Classification Search
CPC .......... B60S 1/34; B60S 1/345; B60S 1/3465; B60S 1/3468; B60S 1/347; B60S 1/3463; Y10T 16/5389
USPC ....... 15/250.351, 250.352; 16/277, 304, 305, 16/308
See application file for complete search history.

(56) References Cited

U.S. PATENT DOCUMENTS

| | | | | |
|---|---|---|---|---|
| 1,362,175 A | * | 12/1920 | Oishei ............ | B60S 1/14 15/250.3 |
| 2,576,996 A | * | 12/1951 | Castedello ........ | G03B 17/02 16/308 |
| 2,602,950 A | * | 7/1952 | Sacchini ........... | B60S 1/34 15/250.202 |
| 3,978,542 A | * | 9/1976 | Van Eekelen ...... | B60S 1/26 15/250.3 |
| 4,007,511 A | * | 2/1977 | Deibel ............. | B60S 1/3801 15/250.47 |

(Continued)

FOREIGN PATENT DOCUMENTS

| | | |
|---|---|---|
| EP | 2177404 | 4/2010 |
| WO | 03037690 | 5/2003 |

OTHER PUBLICATIONS

International Search Report for Application No. PCT/EP2016/071605 dated Dec. 2, 2016 (English Translation, 2 pages).

*Primary Examiner* — Gary K. Graham
(74) *Attorney, Agent, or Firm* — Micheal Best & Friedrich LLP

(57) ABSTRACT

A wiper arm and a windscreen wiper system, wherein the wiper arm comprises a joint part and a lever part and a spring, wherein the parts form a common joint. The spring is embodied here as a torsion spring.

19 Claims, 3 Drawing Sheets

(56) References Cited

U.S. PATENT DOCUMENTS

| | | | | |
|---|---|---|---|---|
| 5,157,551 A | * | 10/1992 | Spence | B60R 1/0602 |
| | | | | 15/250.003 |
| 5,320,333 A | * | 6/1994 | Koch | B60S 1/3475 |
| | | | | 15/250.34 |
| 5,479,077 A | | 12/1995 | Kline et al. | |
| 5,545,956 A | | 8/1996 | Salvio et al. | |
| 6,453,504 B1 | | 9/2002 | Burkard et al. | |
| 8,650,702 B1 | | 2/2014 | Koch | |
| 2010/0218334 A1 | * | 9/2010 | Boland | B60S 1/3468 |
| | | | | 15/250.351 |

* cited by examiner

WIPER ARM AND WINDSCREEN WIPER SYSTEM FOR A MOTOR VEHICLE

BACKGROUND OF THE INVENTION

The invention relates to a wiper arm and a windscreen wiper system.

The WIPO patent specification WO 0303769081 describes a wiper arm with a coil spring. The coil spring is mounted on a joint part and a lever part. The coil spring is attached here with hooks to separate extensions of the parts. In this way, a system is provided which has a large overall height, wherein a hook of the spring projects out of the lever part. Therefore, the overall height of the wiper arm, in the final mounted state, is not only determined by the height of the lever part but also by the spring projecting out of the lever part.

SUMMARY OF THE INVENTION

The apparatus according to the invention has the advantage with respect to the prior art that the overall height of the wiper arm is reduced. In order to achieve the advantageous technical effects, the wiper arm comprises the joint part and the lever part. The joint part is fastened here to an output shaft of the wiper system. The output shaft is connected to a motor and a transmission; thus enabling the motor to deliver kinetic energy via the transmission to the output shaft. The lever part is fitted to the joint part and forms with said joint part a joint which is arranged between the lever part and the joint part. The lever part can be tilted with respect to the joint part by means of the joint. The joint thus generates a degree of freedom. The lever part can be moved in the direction of this degree of freedom. As a result, the lever part can be pivoted. The lever part respectively a rubber element fitted to the lever part rests on the windscreen in order to wipe said windscreen. The lever part can be tilted out of this position. In so doing, said lever part is tilted in the direction of the joint part. The lever part carries out a pivoting movement away from the windscreen. The lever part is held in the position on the windscreen by a spring and preloaded. The spring generates a compressive force onto the windscreen. The lever part is pressed with a torque, which is calculated from the spring force and the length of the lever, in the direction of the windscreen. The lever part and the joint part are thereby connected to one another by means of the spring. The spring therefore generates a relative force between lever part and joint part. In order for the overall height to be effectively reduced, the spring is embodied as a torsion spring. The torsion spring is disposed in the region of the joint.

In an advantageous manner, the joint part and the lever part of the wiper arm have a U-shaped cross-sectional profile with respect to the axial direction. That means that if the lever part respectively the joint part are cut transversely to the axial direction, the cross-section has a profile which has a U-shape. The U-shape is characterized, in that it has two side elements which are arranged transversely to a back element. Hence, the back element is arranged between the side elements. The side elements have a free edge, which in cross-section appears as a free end. The back element is arranged opposite to the free end, said back element being formed integrally with the side elements and passing seamlessly into said side elements. The torsion spring is disposed completely between the side elements, so that the torsion spring does not project between the side elements respectively out of the lever part respectively the joint part. If the joint part respectively the lever part is seen from a perspective in which the observer looks at the side elements in such a way that the back part is aligned with the direction of the perspective, the torsion spring is then completely covered by a side element. In other words: the side element is disposed, in the entire physical extension thereof, in such a way between the side elements that it is completely embedded in the lever respectively the joint part. This embodiment requires a smaller installation space in the direction of extension of the side elements.

The side elements expediently engage around the lever part in the region of the joint. In so doing, the side elements of the lever part are fitted to the joint part from the outside. The side elements of the lever part rest thereby preferably on the side elements of the joint part. The section of the joint part, which is structurally designed to form a joint that interacts with a torsion spring, is to be understood as the region of the joint. Structurally designed is to be understood as constructive measures of mechanical engineering. The region in which the side elements of the lever part are arranged on the joint part, i.e. an overlapping is generated between joint part and lever part, is fixed by a pin. The pin projects here into the space between the side elements. This space is referred to below as the inner space of the joint part respectively the lever part. Furthermore, the pin also projects to the outside at the side elements. The pin is preferably in this case a one-piece pin, which is pushed through the side elements and the parts, so that said pin is supported in the joint part as well as in the lever part. A torsion spring is arranged in the inner space on the pin. The torsion spring winds here around the pin. Hence, the torsion spring is disposed in the inner space of the joint part. If the joint part has side elements, the torsion spring is disposed between the side elements of the joint part while the side elements of the lever part are disposed from the outside on the side elements of the joint parts. The pin thus forms the center of rotation of the joint. The pin is substantially for the joint. The inner space, in which the spring is disposed, is preferably delimited by a transverse web. Hence, the inner space of the joint part is not continuous but is delimited in the region of joint by a web, which runs transversely to the side elements and is integrally formed with said side elements and the back part.

In an advantageous modification, the side elements have lugs. The lugs project into the inner space. The lugs, starting at the free ends of the side elements, are preferably bent here into the inner space. The lugs do not project here over the free ends of the side elements in the direction of extension of the side elements. The direction of extension of the side elements is the direction which extends transversely to the back element. It is conceivable that only one lug is formed on the entire lever part. Preferably a lug is formed in each case on a side element. It is, however, also conceivable that a plurality of lugs is formed on a side element. The lugs can also be formed on the back element. It is also conceivable to form lugs that are not formed on the free ends of the side elements but in the inner space at the side element between the free end and the back element. It is conceivable that the lugs are cut out of the side elements or respectively the back wall. The lugs, which preferably are used, are designed as extensions which extend from the free ends into the inner space and in so doing do not project over the free ends in the direction of extension of the side elements. The lugs form a right angle with the side elements. It is, however, also conceivable that the lugs form another angle than a right angle with the side elements. The lugs are of straight configuration. The torsion spring bears against the lugs. The torsion spring has extensions, which project from the end of the torsion spring. If you were to think about a wire which is wound to a torsion spring, the wire then has two free ends which project from the coil of the torsion spring. These free ends are the extensions. These extensions bear against the lugs. The torsion spring is tensioned by fitting the extensions to the lugs.

If two torsion springs are disposed in the region of the joint, it is then possible to generate an increase in preloading pressure of the lever part onto the window pane. Furthermore, it is possible to uniformly preload the lever part so that a transverse force with respect to the degree of freedom does not act on the joint.

In an advantageous manner, the joint part has a supporting surface, against which an extension of the torsion spring can bear. The supporting surface is designed in such a way that the extension with the free end thereof or respectively with a section between the free end and the first winding of the torsion spring can bear against the joint part. The supporting surface is preferably formed on the back element of the joint part. As a result, a supporting surface is produced which is formed between the side elements. The supporting surface has here especially a surface, which is formed as part of the back element. In so doing, the supporting surface points in the direction of the free ends of the side elements. The supporting surface is disposed at the axial end of the joint part, said axial end being oriented towards the lever part. In this way, a torsion spring can be installed which at least in the preloaded state has extensions which are oriented substantially in a common direction. This means that the extensions enclose an angle between lug and supporting surface that is smaller than 180°. The extensions are preferably oriented here in the direction of the lever part, whereas the torsion spring is disposed on a pin and is arranged between side elements of the joint part in the inner space of the joint part.

It is expedient if an extension of the torsion spring bears against a lug of the side element of the lever part while the second extension bears against the supporting surface of the back element of the joint part. It is also conceivable that at least two extensions of particularly two torsion springs bear against the supporting surface. It is also possible to design a torsion spring that is one piece has, however, two coils and two extensions with free ends. The wire is guided away from the coils in an extension-like manner between the two coil sections of the one torsion spring. This extension-like section has the same direction of extension in the tensioned state as the extensions with the free ends. The extension-like section is straight. The extension-like section consists of the wire, which proceeds from the first coil section in a loop-like manner in order then to carry out a 180° bend and lead to the second coil section. The option of embodying extensions, the supporting surface and the torsion spring in different ways provides the highest degree of flexibility of the device according to the invention.

DETAILED DESCRIPTION

Figure 1:
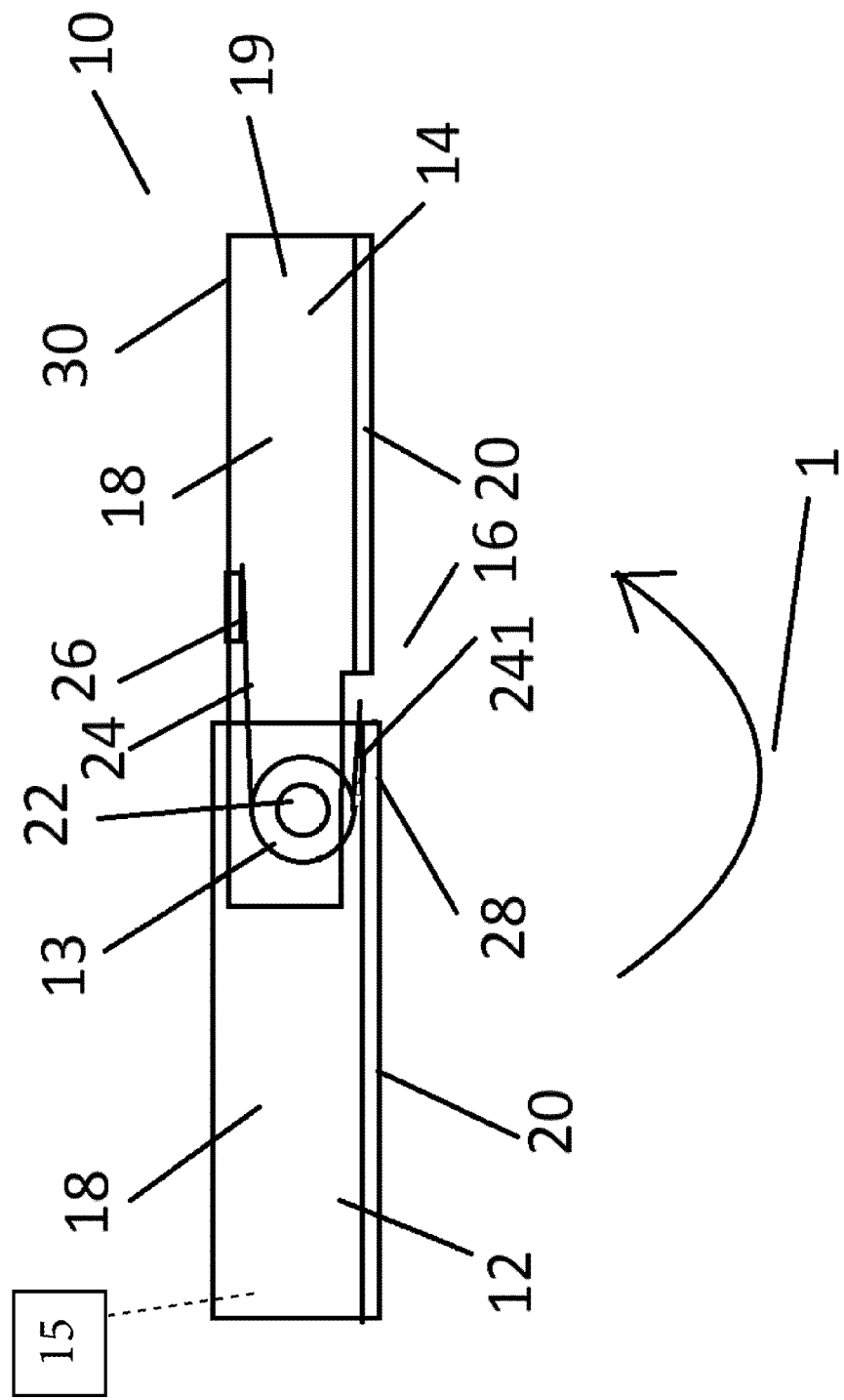
FIG. 1 shows a side view of the wiper arm according to the invention in the region of a joint.

A side view of a wiper arm 10 according to the invention is shown in FIG. 1. The section of wiper arm 10 according to the invention shows the region of the joint 16. The wiper arm 10 has a joint part 12 and a lever part 14. The joint part 12 and the lever part 14 form a common joint 16. The joint 16 interacts with a spring 13. In so doing, the spring 13 is disposed in the joint 16. The spring 13 is embodied as a torsion spring 13. The torsion spring 13 has a coil and at least two extensions 24, 240, 241, 242. The lever part 14 comprises a back element 20 and two side elements 18. The side elements 18 have a free end 30. The back element 20 is integrally connected to the side element 10 on the opposite end in relation to the free end 30. A u-shaped cross-section of the lever part 14 is achieved in this way. An inner space 19 is formed in this way between the side elements 18. The joint part 12 also has a similar structure. The joint part 12 likewise has side elements 18 and a back element 20, which are arranged in a similar manner in relation to one another. The side elements 18 of the lever part 14 are arranged from the outside along the side elements 18 of the joint part 12 so that the side elements of the lever part 14 rest on the side elements 18 of the joint part 12. The lever part 14 engages around the joint part 12. The lever part 14 and the joint part 12 form the common joint 16 by a pin 22 projecting through the parts 12, 14. The pin 22 is supported in both the joint part 12 and the lever part 14. In this way, a relative movement between the joint part 12 and the lever part 14 is possible. The movement is a pivoting movement in one direction and thus forms a degree of freedom for the lever part 14. The torsion spring 13 is disposed on the pin 22. The extensions 24 bear against the parts 12, 14. A lug 26 is formed at the free end 30 of the side element 18 of the lever arm 14, said lug projecting into the inner space 19 and does not project over the free end 30 in relation to the direction of extension of the side element 18 transversely to the back element 20. The lug 20 is formed parallel to the back element. An extension 24, 240 bears against the lug 26. This first extension positions the coil spring 13 and adjusts a defined preloading force with which the lever part 14 is tensioned. The coil spring 13 also has a second extension 241, which bears against a supporting element 28 of the joint part 12. The supporting surface 28 is arranged on the back element 20 of the joint part in such a way that it points in the inner space 19 in the direction of the free ends 30 of the side elements 18. Hence, the second extension 241 bears with a section against the supporting section 28 between the end thereof and the coil spring. In order for the joint 16 to be formed, the back element 20 of the lever part 14 is recessed in the region of the torsion spring 13. Substantially only side elements 18 of the lever part 14 are formed in the region of the torsion spring 13 respectively in the region of the joint 16. That essentially means that a section, which does not have a back element 20, is formed at the end of the lever part 14 which is oriented towards the joint part 12.

Figure 2:
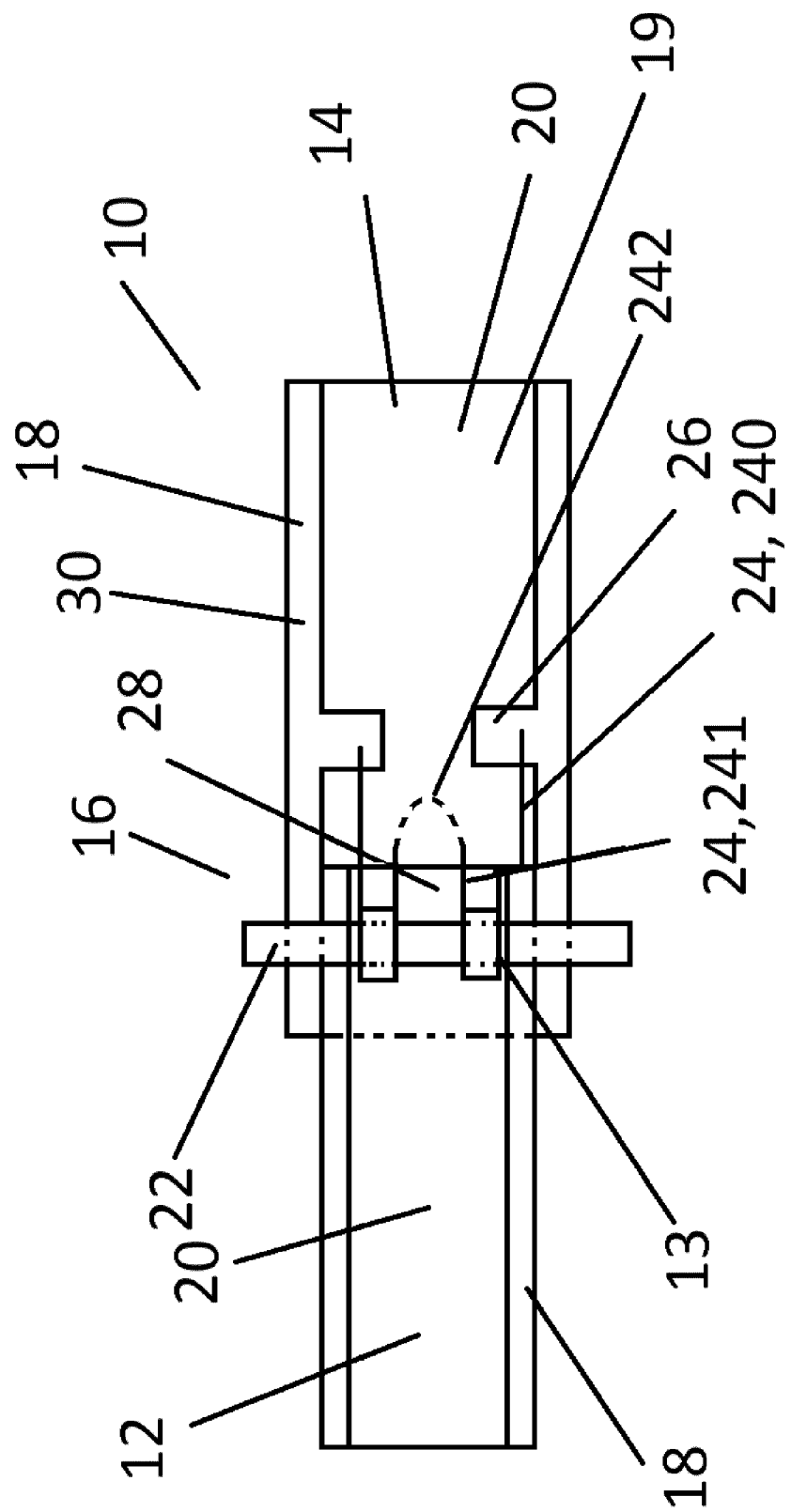
FIG. 2 shows a top view into the inner space of the wiper arm in the region of the joint.

The top view of the wiper arm 10 is shown in FIG. 2; thus enabling a view into the inner space 19 of the wiper arm. Two lugs 26 are formed here. A lug 26 is formed in each case on a side element 18 on the free end 30. A first extension 240 bears in each case against each lug 26. This is achieved by two torsion springs 13 being arranged on the pin 22. Therefore, two second extensions 241 rest on the supporting surface 28. It is also conceivable that the torsion springs 13 are designed as one torsion spring 13, which has two coils. The second extensions 241 are therefore configured as an extension-like loop 242. The extension-like loop 242 is depicted by the dashed line. The loop 242 extends from the coils 13 of the torsion spring 13 in the direction of the lever part 14. The extension-like loop 242 is therefore formed by two wires, in contrast to the first extension 240 that constitutes only one wire with a free end. The supporting surface 28, against which the extensions 240 bear, is formed on the end of the joint part 12. The end referred to here is that end which is oriented towards the lever part 14. The pin 22 is guided through the side elements 16 of the two parts 12, 14. The torsion spring 13 is arranged in the region in the inner space 19 on the pin 22 by the side elements 18 of the two parts 12, 14 overlapping one another. Thus, a side element 18 of the lever part 14, then a side element 18 of the joint part 12 and subsequently the torsion spring 13 are arranged along the pin 22. It is also conceivable that the side element 18 of the joint part 12 is first arranged along the pin and subsequently the side element 18 of the lever part 14.

Figure 3:
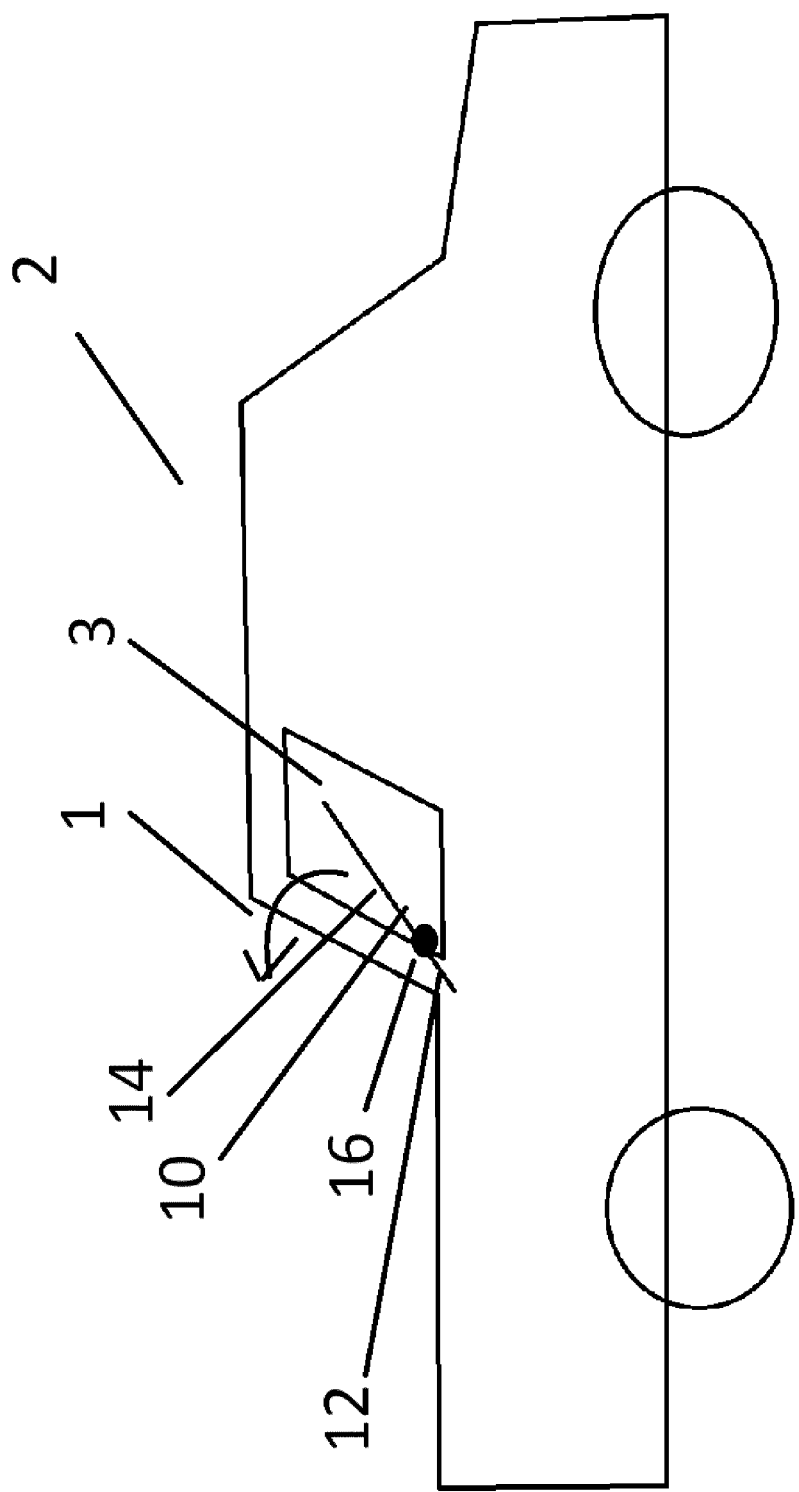
FIG. 3 shows a motor vehicle comprising the wiper arm according to the invention.

In FIG. 3, a motor vehicle is shown, which has a wiper arm 10 according to the invention. The wiper arm 10 comprises the joint part 12 and the lever part 14, the joint 16 being arranged between the two parts 12, 14. The joint part 12 is mounted on an output shaft 15 (see in FIG. 1). The output shaft is driven here by a motor. The motor and the output shaft are installed in the motor vehicle such that only the output shaft projects out of the body of the motor vehicle 2, the joint part 12 being fastened to said output shaft. The lever part 14 can be tilted by the joint 16. In so doing, the lever part 4 can be tilted away from a window pane 3 in the direction of the degree of freedom 1. The torsion spring 13 generates a preloading force, with which the lever part 14 is pressed against the window pane 3. The torsion spring 13 also generates a torque which leads to the fact that a force is necessary in order to pivot the lever part 14 along the degree of freedom 1.

The features of the preceding text can be combined with one another so that useful embodiments can be achieved in the technical field of the wiper arm with torsion springs 13. Furthermore, all features shown in the drawings 1 to 3 that were not explicitly described in the text are to be understood as explicit disclosures of the invention. These features can likewise be combined in the further course with the features from the description.

What is claimed is:

1. A wiper arm (10), wherein the wiper arm (10) comprises a joint part (12) and a lever part (14) and a spring (13), wherein the joint and lever parts (12, 14) form a common joint (16) so that the lever part (14) has a degree of freedom (1) relative to the joint part (12), wherein the joint and lever parts (12, 14) are thereby connected to one another by the spring (13), wherein the lever part (14) is positioned along the degree of freedom (1) by the spring (13), and the spring (13) includes at least one torsion spring (13), which is disposed in a region of the joint (16), wherein the joint and lever parts (12, 14) each have a U-shaped axial cross-sectional profile, which is formed by two side elements (18) and a back element (20), wherein the side elements (18) are attached to the back element (20) and extend transversely to the back element (20), and the at least one torsion spring (13) is completely disposed between the side elements (18) of each of the joint and lever parts, wherein the side elements (18) of the lever part each have a lug (26), wherein the lugs (26) project between the side elements (18) of the lever part, and the at least one torsion spring (13) has extensions (24) for tensioning said torsion spring (13), wherein the extensions (24) bear against the lugs (26).

2. The wiper arm (10) according to claim 1, characterized in that the side elements (18) of the lever part (14) engage around the joint part (12) in the region of the joint (16), and a pin (22) projects through the side elements (18) of the lever part and the side elements of the joint part (12) transversely to a longitudinal direction (1), wherein the at least one torsion spring (13) is disposed on the pin (22).

3. The wiper arm (10) according to claim 1, characterized in that the at least one torsion spring includes exactly two torsion springs (13) that are disposed in the joint (16).

4. The wiper arm (10) according to claim 1, characterized in that the joint part (12) has a supporting surface (28) for an extension (24) of the at least one torsion spring (13), wherein the supporting surface (28) is formed on the back element (20) of the joint part.

5. The wiper arm (10) according to claim 4, characterized in that the at least one torsion spring includes a further extension that bears against the supporting surface (28).

6. The wiper arm (10) according to claim 4, characterized in that one of the extensions (240) of the at least one torsion spring bears against a lug (26) of the lever part and at least two of the extensions (241) of the at least one torsion spring bear against the supporting surface.

7. A windscreen wiper system (11) for a motor vehicle (2) comprising a wiper arm (10) according to claim 1.

8. The wiper arm according to claim 1, wherein the side elements (18) of the joint part (12) are arranged transversely to the back element (20) of the joint part (12).

9. A motor vehicle comprising:
an output shaft (15); and
the wiper arm according to claim 1, wherein the joint part (12) is coupled to the output shaft (15), such that the joint part (12) is disposed between the output shaft and the lever part (14).

10. The motor vehicle of claim 9, wherein the side elements (18) of the lever part (14) engage around the joint part (12) in the region of the joint (16), and a pin (22) projects through the side elements (18) of the lever part and the side elements of the joint part (12) transversely to a longitudinal direction (1), wherein the at least one torsion spring (13) is disposed on the pin (22).

11. A wiper arm (10), wherein the wiper arm (10) comprises a joint part (12) and a lever part (14) and a spring (13), wherein the joint and lever parts (12, 14) form a common joint (16) so that the lever part (14) has a degree of freedom (1) relative to the joint part (12), wherein the joint and lever parts (12, 14) are thereby connected to one another by the spring (13), wherein the lever part (14) is positioned along the degree of freedom (1) by the spring (13), and the spring (13) is a torsion spring (13), which is disposed in a region of the joint (16), wherein the joint and lever parts (12, 14) each have a U-shaped axial cross-sectional profile, which is formed by two side elements (18) and a back element (20), wherein the side elements (18) are attached to the back element (20), and the torsion spring (13) is completely disposed between the side elements (18) of each of the joint and lever parts, wherein the joint part (12) has a supporting surface (28), wherein the supporting surface (28) is formed on the back element (20) of the joint part, wherein one extension (240) of the torsion spring bears against a lug (26) of the lever part and at least two extensions (241) of the torsion spring (13) bear against the supporting surface.

12. The wiper arm (10) according to claim 11, wherein the side elements (18) of the lever part (14) engage around the joint part (12) in the region of the joint (16), and a pin (22) projects through the side elements (18) of the lever part and the side elements of the joint part (12) transversely to a longitudinal direction (1), wherein the torsion spring (13) is disposed on the pin (22).

13. The wiper arm (10) according to claim 11, wherein exactly two torsion springs (13) are disposed in the joint (16).

14. The wiper arm (10) according to claim 11, wherein respectively one lug (26) is mounted on each side element (18) of the lever part (14).

15. A windscreen wiper system (11) for a motor vehicle (2) comprising a wiper arm (10) according to claim 11.

16. The wiper arm according to claim 11, wherein the side elements (18) of the joint part (12) are arranged transversely to the back element (20) of the joint part (12).

17. The wiper arm according to claim 11, wherein the side elements (18) of the lever part (14) are arranged transversely to the back element (20) of the lever part (14).

18. A motor vehicle comprising:
an output shaft (15); and
the wiper arm according to claim 11, wherein the joint part (12) is coupled to the output shaft (15), such that the joint part (12) is disposed between the output shaft and the lever part (14).

19. The motor vehicle of claim 18, wherein the side elements (18) of the lever part (14) engage around the joint part (12) in the region of the joint (16), and a pin (22) projects through the side elements (18) of the lever part and the side elements of the joint part (12) transversely to a longitudinal direction (1), wherein the torsion spring (13) is disposed on the pin (22).

\* \* \* \* \*